Oct. 12, 1948. G. A. HALFVARSON 2,451,216
PISTON AND CONNECTING ROD
Filed July 18, 1946
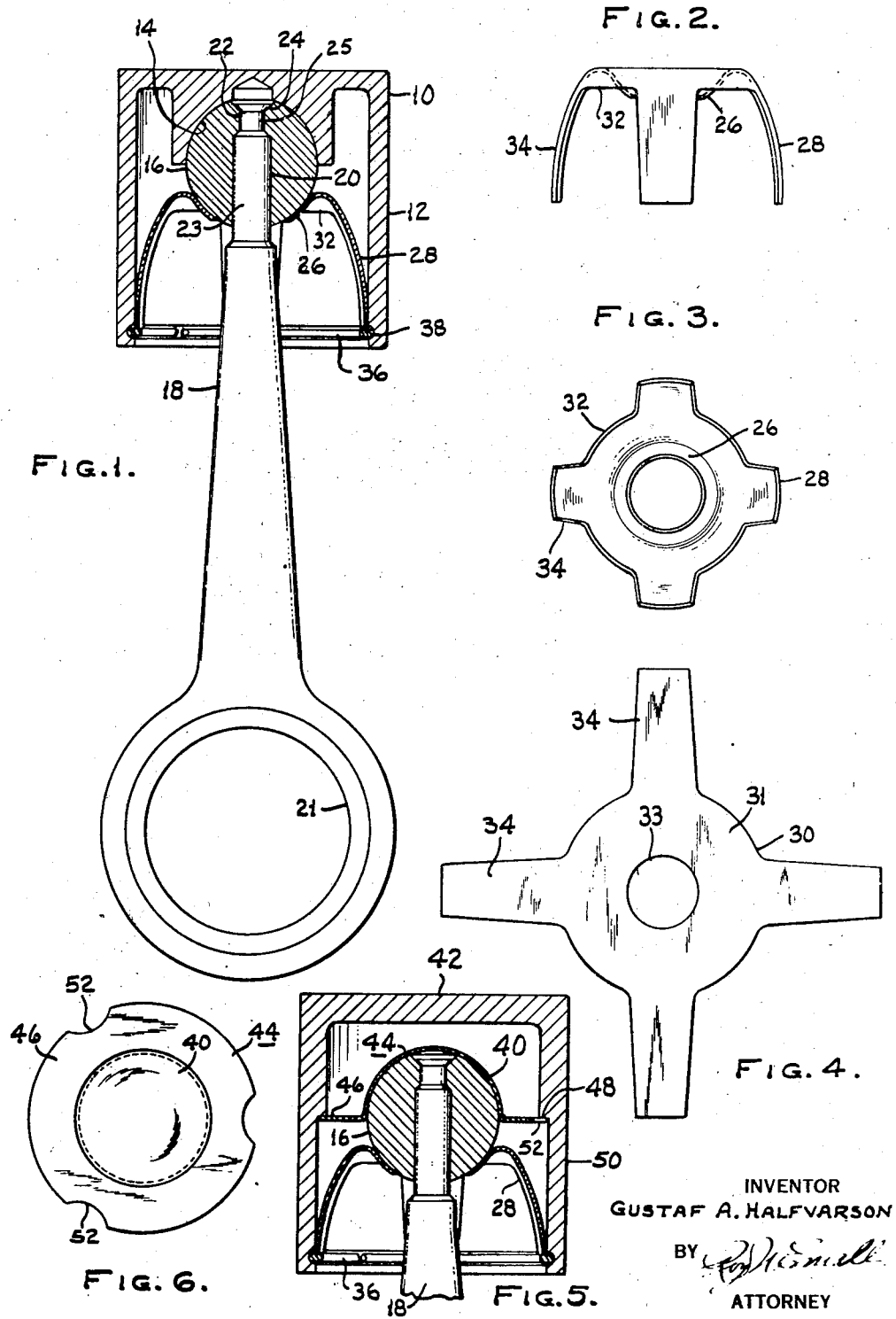
INVENTOR
GUSTAF A. HALFVARSON Patented Oct. 12, 1948

2,451,216

UNITED STATES PATENT OFFICE 2,451,216

PISTON AND CONNECTING ROD

Gustaf A. Halfvarson, Springfield, Mass., assignor to Westinghouse Electric Corporation, East Pittsburgh, Pa., a corporation of Pennsylvania Application July 18, 1946, Serial No. 684,521

5 Claims. (Cl. 309—20)

This invention relates to a connecting rod and piston assembly and more especially to a joint between the connecting rod and piston.

It is an object of the invention to provide a novel, low-cost joint between a connecting rod and a piston.

A further object of the invention is to provide a novel joint of the type described, which comprises inexpensive sheet metal parts.

These and other objects are effected by my invention as will be apparent from the following description and claims taken in connection with the accompanying drawings forming a part of this application, in which:

Fig. 1 is a view, partly in cross section, of the joint of this invention;

Fig. 2 is an elevation of the retainer of the joint;

Fig. 3 is a bottom view of the retainer shown in Fig. 2;

Fig. 4 is a view of the blank from which the retainer of Figs 2 and 3 is formed;

Fig. 5 is a view similar to Fig. 1 of a modification of this invention; and

Fig. 6 is a plan view of the upper socket of the joint shown in Fig. 5.

In the drawings, the reference numeral 10 designates a piston having a dependent skirt 12. A spherical socket 14 is formed in the upper portion of the interior of the piston, which socket engages the upper part of a ball 16 of hardened steel secured to the upper end of a connecting rod 18. The lower end of the connecting rod 18 comprises a crankshaft bearing 21. The securement of the ball 16 to the connecting rod 18 comprises a bore through the ball 16, which bore has a body portion 20, a neck portion 22 above the body portion 20, and a countersunk portion 24 above the neck portion 22. The upper end of the connecting rod 18 lies in the body portion 20 of the bore and has an extension 25 which projects through the neck portion 22 and the countersunk portion 24. The portion projecting through the countersunk portion 24 is upset to fill the countersunk portion 24 of the ball 16 and secure the ball 16 to the connecting rod 18.

The lower portion of the ball 16 is engaged by a retainer 28. The retainer 28 is formed from a unitary sheet metal blank 30 (see Fig. 4) comprising a disk portion 31 having a central opening 33 therein and four legs 34 at the periphery of the disk portion 31. The central portion of the blank 30 is depressed to form a socket 26. The portion surrounding the socket 26 is turned downwardly to form a flange 32 to stiffen the upper portion of the retainer 28. The legs 34 continue in the same general curvature and, because of their curvature, provide a slight springiness lengthwise of the legs. The retainer 28 is hardened after forming. The retainer 28 is secured in place in the piston 10 by means of a split retainer ring 36 lying in a groove 38 near the lower edge of the piston skirt 12. The retainer ring 36 forms a shoulder on the interior of the skirt 12 and is preferably located below the center of curvature of the socket 14 a distance equal to at least one half of the diameter of the piston 10.

In assembling the joint of this invention, the retainer 28 is slipped over the connecting rod 18, the ball 16 is then placed on the end of the connecting rod, and the connecting rod end upset into the countersunk portion 24 of the ball 16. The ball 16 is then placed in the socket 14 and the retainer 28 pushed approximately into position. The retainer ring 36 is then forced upwardly into position in the groove 38. The legs 34 of the retainer 28 are of such length that they are slightly compressed endwise when the split ring 36 is forced into position. The ball 16 is thus held between the two sockets 14 and 26 by a slight and resilient clamping pressure, the resilience being sufficient to take up the normal wear between the ball 16 and the two sockets 14 and 26 during use of the assembly. This joint is of use primarily in the compressor of a domestic refrigerator, the piston being about one inch in diameter and running at a speed of about 1750 strokes per minute.

A modification of the joint of this invention is shown in Figs. 5 and 6, in which parts identical to those of the first-described modification are provided with the same reference numerals. In this modification, the upper socket 40 of the piston 42 is a hat-shaped stamping of sheet metal 44. The brim 46 of the stamping 44 engages a shoulder 48 formed in the skirt 50 of the piston 42.

It will be apparent from the above that this invention provides a joint between a connecting rod and a piston, which joint is formed of inexpensive sheet metal parts.

While I have shown my invention in several forms, it will be obvious to those skilled in the art that it is not so limited but is susceptible of various other changes and modifications without departing from the spirit thereof.

What I claim is:

1. A piston and a connecting rod assembly comprising a piston having a dependent skirt, a spherical socket in said piston, a shoulder on the interior of said skirt, said shoulder being located below the center of curvature of said socket a distance equal to at least one-half the diameter of said piston, a connecting rod having a spherical head, the upper portion of said head lying in said socket, and a retainer comprising a unitary stamping of sheet metal, said stamping having a socket formed therein which engages the under side of said spherical head and an opening in the center of said socket through which opening said connecting rod extends, said socket being in the form of a complete segment of a sphere, said stamping including a plurality of legs at the outer edge of said socket, said legs extending diagonally downwardly and resting on said shoulder.

2. A piston and connecting rod assembly as described in claim 1 in which said legs are resilient lengthwise and stressed to bias the socket portion of the retainer against said spherical head, said resiliency and stress being sufficient to maintain a close working fit between the ball and said two sockets in spite of normal wear therebetween.

3. A piston and connecting rod assembly as defined in claim 1 in which said legs are resilient lengthwise and in which the shoulder is insertable into its position in the piston skirt when the piston rod and retainer are in place in the piston, said insertion of said shoulder stressing said legs to bias said socket of the retainer and said spherical head of the connecting rod toward the socket in said piston.

4. A piston and connecting rod assembly comprising a piston having a dependent skirt, a spherical socket in said piston, a shoulder on the interior of said skirt, said shoulder being located below the center of curvature of said socket a distance equal to at least one-half the diameter of said piston, a connecting rod having a spherical head, the upper portion of said head lying in said socket, and a retainer comprising a unitary stamping of sheet metal, said stamping having a socket formed in a side of said sheet metal which socket engages the under side of said spherical head, an opening in the center of said socket through which opening said connecting rod extends, a downwardly-turned flange portion at the outer edge of and surrounding said socket, and a plurality of legs at the outer edge of said flange portion, said legs extending diagonally downwardly and resting on said shoulder.

5. A piston and connecting rod assembly comprising a piston having a dependent skirt, a spherical socket in said piston, a supporting element detachably secured on the interior of said skirt, said supporting element being located below the center of curvature of said socket a distance equal to at least one-half the diameter of said piston, a connecting rod having a spherical head, the upper portion of said head lying in said socket, and a retainer comprising a stamping of sheet metal, said stamping having a socket formed therein which engages the under side of said spherical head and an opening in the center of said socket through which opening said connecting rod extends, said stamping including a plurality of legs formed with undulations to provide resiliency lengthwise of said legs, said legs extending diagonally downwardly from said socket to engage said supporting element, said supporting element being adapted to be moved upwardly into position after said connecting rod and retainer are in place and to engage the lower end of said legs during said upward movement to stress said legs endwise.

GUSTAF A. HALFVARSON.

REFERENCES CITED

The following references are of record in the file of this patent:

UNITED STATES PATENTS

| Number | Name | Date |
|---|---|---|
| 1,839,592 | Reynolds | Jan. 5, 1932 |
| 2,317,577 | Ackerman | Apr. 27, 1943 |
| 2,089,614 | Lordo | Aug. 10, 1937 |
| 2,103,664 | Smith | Dec. 28, 1937 |

FOREIGN PATENTS

| Number | Country | Date |
|---|---|---|
| 138,022 | Great Britain | June 29, 1920 |
| 434,957 | Germany | Oct. 4, 1926 |